John T. Hovis.
Plow-Attachment.
No. 116446.      PATENTED JUN 27 1871
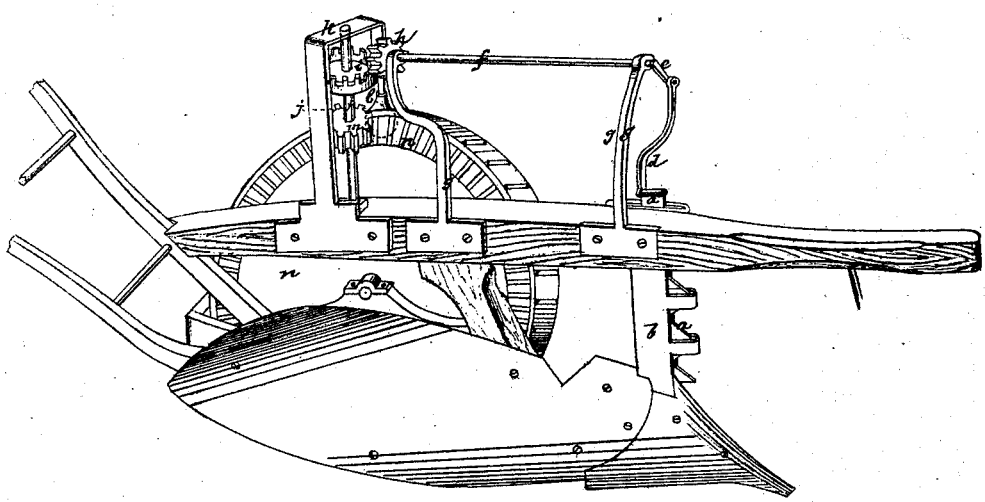
Witnesses:          Inventor:
                             John T. Hovis.
                          Per
                          Attorneys.

UNITED STATES PATENT OFFICE.

JOHN T. HOVIS, OF CLINTONVILLE, PENNSYLVANIA.

IMPROVEMENT IN PLOW ATTACHMENTS FOR CUTTING STUBBLE.

Specification forming part of Letters Patent No. 116,446, dated June 27, 1871.

*To all whom it may concern:*

Be it known that I, JOHN T. HOVIS, of Clintonville, in the county of Venango and State of Pennsylvania, have invented a new and Improved Plow Attachment; and I do hereby declare the following to be a full, clear, and exact description of the same, reference being had to the accompanying drawing making a part of this specification, in which the figure is a perspective view.

This invention relates to the combination, with a plow, of a vertically-reciprocating cutter-bar, similar to those used in mowing-machines; the office of which is to sever such lodged and prostrate grass as may lie in the line of the furrow, thus preventing the plow from clogging with such vegetable matter, and also enabling it to turn the same under, so that it may rot and fertilize the soil.

Referring to the drawing, $a$ is the vertical cutter-bar aforesaid, the same working between two vertical finger-bars, $b$, connected at their upper ends with the beam $c$ and at their lower ends with the plow, through which there is an orifice in which the cutter-bar works. The upper end of the cutter-bar is connected by a pitman, $d$, with a crank, $e$. The crank $e$ extends from one end of a horizontal shaft, $f$, that is supported above the beam $c$ in standards $g$, that spring from said beam. On the other end of the shaft $f$ is fixed a pinion, $h$, that engages with a crown-wheel, $i$, placed on a shaft, $j$, that is supported horizontally in a yoke, $k$, that springs from the beam $c$, passes over the crown-wheel $i$, and extends downward to the other side of the beam $c$, bearing at its end a roller, $l$. On the shaft $j$, below the wheel $i$, is fixed a pinion, $m$, that engages with an annular row of teeth formed on the side of a large spur-gear, $n$, whose axis is in the plow, and which extends far enough below the same to come in contact with the earth as the plow advances, and which, owing to such contact, is thereby rotated. The roller $l$ causes the wheel $n$ to rotate steadily. Its rotation, through the instrumentality of the pinion $m$, shaft $j$, crown-wheel $i$, pinion $h$, shaft $f$, crank $e$, and pitman $d$, causes the cutter-bar $a$ to reciprocate.

The cutter-bar being arranged to reciprocate vertically, the weeds, stubble, &c., are divided without being pushed or forced away, and allowed to pass backward on each side of the plow, the desired result being thus obtained with a minimum expenditure of force.

Having thus described my invention, what I claim as new, and desire to secure by Letters Patent, is—

The reciprocating cutter $a$, finger-bar $b$, pitman $d$, shaft $f$, pinion $h$, crown-wheel $i$, shaft $j$, pinion $m$, and wheel $n$, arranged, in connection with a plow, substantially as shown and described.

JOHN T. HOVIS.

Witnesses:
JOHN C. HOVIS,
J. B. MCMILLAN.